United States Patent [19]

Walker

[11] 4,264,043
[45] Apr. 28, 1981

[54] STABILIZER FOR AEROSPACE VEHICLES

[76] Inventor: Robert A. Walker, 2240 Sawtelle, Los Angeles, Calif. 90064

[21] Appl. No.: 915,527

[22] Filed: Jun. 14, 1978

Related U.S. Application Data

[63] Continuation of Ser. No. 695,572, Jun. 14, 1976, abandoned.

[51] Int. Cl.³ .............................................. B64C 5/06
[52] U.S. Cl. .................................. 244/91; 244/3.24; 102/3; 273/423
[58] Field of Search ................. 244/91, 198, 199, 87, 244/91, 119, 130, 125, 324, 33; 102/3; 273/106.5 C

[56] References Cited

U.S. PATENT DOCUMENTS

| | | | |
|---|---|---|---|
| 1,701,451 | 2/1929 | Hall et al. | 244/119 |
| 2,099,229 | 11/1937 | Possenheim | 244/87 |
| 2,796,262 | 6/1957 | Folberth et al. | 273/106.5 C |
| 2,899,899 | 8/1959 | Hirsch | 244/3.24 |
| 3,419,232 | 12/1968 | McStay et al. | 244/119 |
| 3,873,048 | 3/1975 | Platou | 244/3.3 |
| 3,960,345 | 6/1976 | Lippert Jr. | 244/41 |
| 3,968,783 | 7/1976 | Pfotenhauer | 273/106.5 C |

FOREIGN PATENT DOCUMENTS 561883 8/1923 France ...................................... 244/91

OTHER PUBLICATIONS 1974-1975 James All The World's Aircraft, Taylor (Editor), pp. 59,262-265.

Primary Examiner—Galen L. Barefoot
Attorney, Agent, or Firm—Christie, Parker & Hale

[57] ABSTRACT

An elongated channel-shaped stabilizer for use with aircraft and other aerospace vehicles for the purpose of providing additional stability and control in flight. The stabilizer can be fastened externally or molded into the fuselage of an aircraft and is specially suited for small aircraft, particularly those having V-wing tail assemblies. Single and multiple stabilizers can be provided and located at various points around the fuselage or hull of the vehicle, including top, bottom and sides. The channel configuration is generally U-shaped with straight or inwardly canted or bent sides.

30 Claims, 16 Drawing Figures

U.S. Patent    Apr. 28, 1981    4,264,043
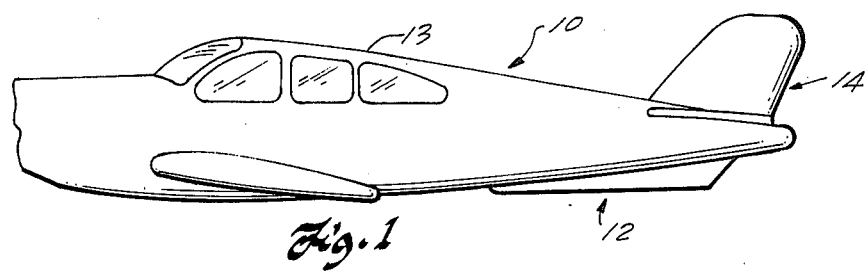
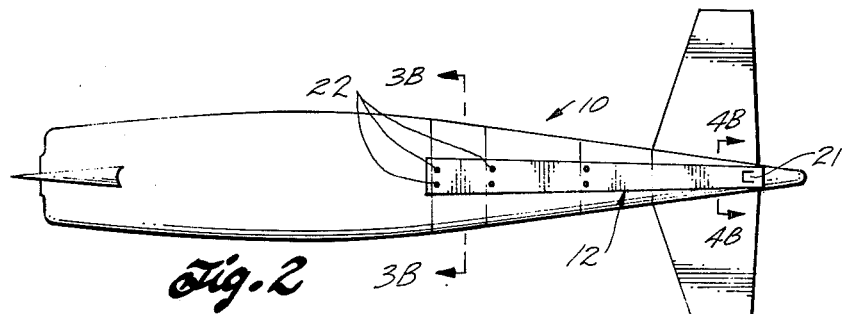
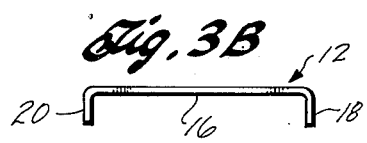
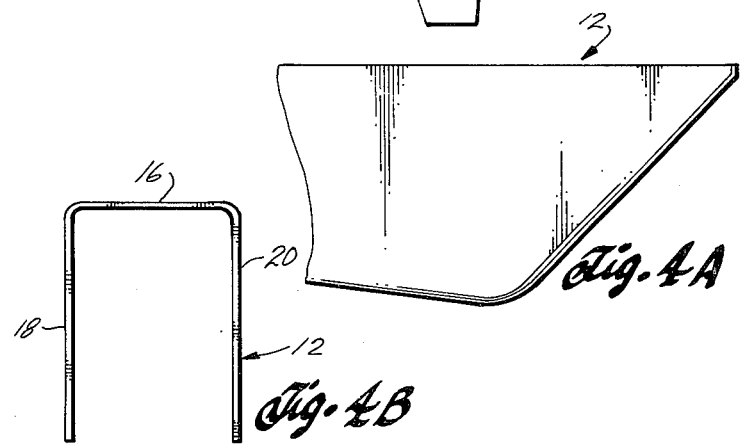
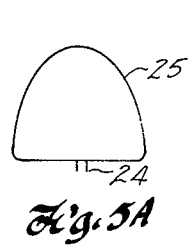
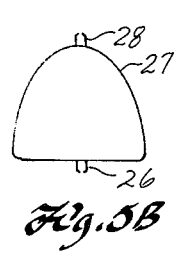
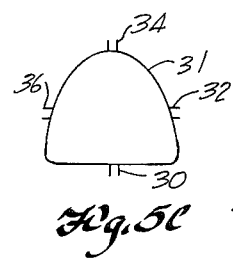
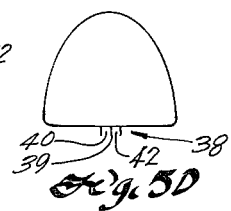
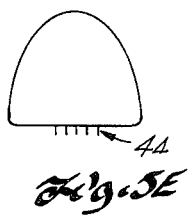
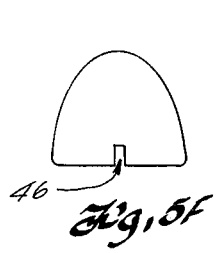
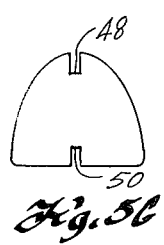
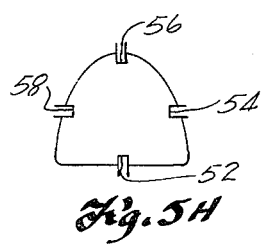

STABILIZER FOR AEROSPACE VEHICLES

CROSS REFERENCE TO RELATED APPLICATIONS

This is a continuation of applicaton Ser. No. 695,572, filed June 14, 1976, now abandoned.

BACKGROUND OF THE INVENTION

The present invention relates to stabilizers for aircraft and aerospace vehicles and in particular to channel-shaped accessories to be attached or built into the fuselage of such a vehicle.

In certain types of light aircraft, such as, for example, Beechcraft Bonanzas, the design of the craft calls for stabilizers at the tail which are inclined upwardly from both sides at an angle to the horizontal. This is in contrast with more conventional construction of this portion of an aircraft in which one vertical and two horizontal stabilizers are provided.

Although the Bonanza is a high performance, well designed aircraft due in part to the V-shaped configuration of the rear stabilizers, a certain amount of directional instability has been found to result from such a configuration resulting in problems in holding course heading and resulting in "fishtailing" during course adjustments.

SUMMARY OF THE INVENTION

The present invention provides a stabilizer for aerospace vehicles comprising an elongated channel extending longitudinally and opening outwardly of the fuselage of the vehicle. In one embodiment the channel member is an accessory which is U-shaped in configuration and is attached to the hull by means of fasteners driven through the web or base member of the U-shaped channel into the fuselage of the aircraft. The side opposite the base member of the channel is open. The side members of the channel are straight and in a presently preferred embodiment, the free ends of these side members are canted inwardly toward each other.

In the preferred embodiment, the side members of the channel have a taper which enlarges from the leading end to the rear end with the point of maximum length of the side members being located toward the rear end.

The advantages of the present invention are manifold including a substantial improvement in the stability and control of aircraft. The increase in stability is achieved with essentially no decrease in performance of the craft due to drag. Other advantages proceeding from incorporation of such a modification into aircraft are the ability to use a lower speed and to obtain greater control during landing approaches. With the stabilizer incorporated into the aircraft, the pilot is able to hold a course or heading thus providing among other advantages a savings in fuel consumption and a positive reduction in the amount of hunting and tail wagging normally necessitated by the pilot while trying to hold a course and during course adjustments. The invention is applicable to all types of aircraft both those having V-shaped tails, conventional tails and aerospace vehicles, such as rockets.

DESCRIPTION OF THE DRAWINGS

These and other advantages of the invention will be better understood by reference to the figures of the drawings wherein:

FIG. 1 is a side elevation of an aircraft having the stabilizer of the present invention attached to the rear underside of the fuselage;

FIG. 2 is a bottom plan view of the aircraft shown in FIG. 1.

FIG. 3A is a fragmentary side elevation view of the leading end of the stabilizer according to the present invention;

FIG. 3B is a sectional view of the stabilizer taken along lines 3B—3B of FIG. 2;

FIG. 4A is a fragmentary side elevation view of the trailing end of the stabilizer of the present invention;

FIG. 4B is a sectional view of the stabilizer taken along lines 4B—4B of FIG. 2;

FIGS. 5A through 5H are schematic representations of the utilization of the stabilizer of the present invention in various positions and in various configurations on the hull of an aircraft.

DESCRIPTION OF A SPECIFIC EMBODIMENT

Figure 6A:
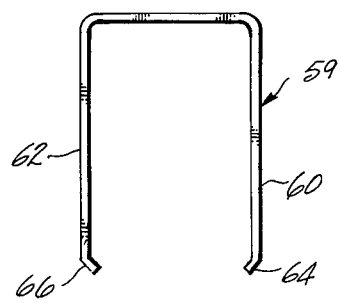
FIG. 6A is a sectional view similar to FIG. 3B of an alternate embodiment of the stabilizer.

The stabilizer of the present invention is shown in FIGS. 1–4 as it is affixed to the underside of the fuselage of an aircraft 10. As shown therein the invention is an elongated member 12 extending approximately from a point to the rear of the passenger cabin 13 to a point near the tail 14 of the aircraft.

As is better illustrated in FIGS. 3A, 3B, 4A and 4B, the stabilizer consists of a U-shaped channel member 12 having a base 16 and two downwardly extending arms or sides 18 and 20.

In a presently preferred embodiment, the channel is provided with a taper which enlarges in a direction toward the rear of the aircraft. As applied to small private aircraft, such as a four place airplane, the channel in a preferred embodiment is approximately eight feet in length, approximately one inch deep at the leading end, approximately four inches deep at the trailing end and approximately four inches wide. It is attached to the underside of the aircraft by means of fasteners 22. The base member 16 has a cutout area 21 at the trailing end for accommodating the tie down hook (not shown) normally found at the rear of the aircraft.

The schematic diagrams of an aircraft fuselage shown in FIGS. 5A through 5H illustrate alternative embodiments of the present invention. As shown in FIG. 5A, the stabilizer of the present invention is a single U-shaped channel 24 attached externally to the underside of the fuselage 25 of the aircraft. In FIG. 5B a first stabilizer 26 and a second stabilizer 28 are externally attached to the fuselage of the aircraft at the underside and top side of the fuselage 27, respectively. Both stabilizers have the free edges of the channel bent inwardly as will be discussed in greater detail in conjunction with FIGS. 6A and 6B. FIG. 5C illustrates the provision of stabilizers 30, 32, 34, 36 on all four sides of the fuselage 31 of an aircraft.

In addition to a single U-shaped channel member the invention contemplates the provision of a stabilizer 38 having multiple side-by-side channels 40, 42, by the provision an auxiliary vertical arm or strips 39 bisecting and extending longitudinally of the base member of the U-shaped channel. The embodiment of a stabilizer 44 having four side-by-side channel is illustrated in FIG. 5E.

In addition to being affixed to the exterior of the fuselage of an aerodynamic vehicle, the stabilizer of the present invention also contemplates the provision of one or more channel-shaped stabilizers by restructuring the fuselage of the vehicle to provide a recessed channel 46 as shown in FIG. 5F. In this embodiment the stabilizer of the present invention has a configuration similar to that shown in FIGS. 1 through 4 in that it has an enlarging taper from front to rear, the channel being shallow at the leading end and significantly deeper at the trailing end. In a presently preferred embodiment, again as applied to a small aircraft, the general dimensions of the recessed channel are approximately one inch deep at the leading end, approximately four inches deep at the trailing end, approximately four inches wide, and the length is approximately eight feet.

In FIG. 5G is shown a pair of recessed stabilizers 48, 50 similar to the positioning of the external stabilizers illustrated in FIG. 5B.

In a final embodiment, FIG. 5H illustrates the provision of a stabilizer according to the present invention in which the stabilizers are formed by restructuring the hull of the aircraft to provide the channels 52, 54, 56 and 58 partially recessed and partially extending beyond the skin of the fuselage of the aircraft.

Figure 6B:
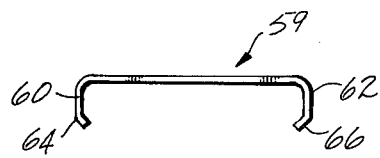
FIG. 6B is a sectional view similar to FIG. 4B of an alternate embodiment of the stabilizer.

An alternate embodiment to the stabilizer configurations of FIGS. 3A, 3B, 4A and 4B is shown in FIGS. 6A and 6B. In these figures, the free longitudinal edges of the sides 60,62 of the channel are bent or canted to provide flanges 64,66 extending inwardly toward the center of the channel-shaped member 59. The air flowing into the channel is believed to be compressed due to the pressure of the flanges, yielding a further improvement in stability and adding of measure of lift to the aircraft.

The channeling of the airstream creates a directed column of air extending from front to rear of the aircraft which exerts a force on the aircraft through the channel tending to maintain alignment of the fuselage on the directional or attitudinal heading established by the control surfaces of the craft. When placed at the bottom and/or top of the fuselage, the stabilizer tends to maintain the aircraft stable about the vertical or yaw axis of the aircraft. When placed at the sides, the stabilizer tends to maintain the aircraft stable about the horizontal pitch axis of the aircraft. It is contemplated that when applied to small, conventionally configured aircraft, the stabilizer of the present invention can replace the conventional vertical stabilizer of such craft retaining the control and stability obtained from such a vertical stabilizer while eliminating the drag inherent therein. Reduction in drag yields further improvement in aircraft performance and fuel economy.

The attachment of one or more external channels to the hull of an aircraft also has the effect of strengthening the fuselage of the plane. In addition to its prime application for use with aircraft having a V-shaped tail, the invention is equally applicable to conventionally structured aircraft, both as a complement to or as a supplement for conventional horizontal and vertical stabilizers and to other aerospace vehicles, such as rockets.

In flight, the stabilizer substantially makes the aircraft extremely stable and able to hold a course with the substantial reduction in the amount of course correction by the pilot. The stabilizer of the present invention adds substantially to the performance of the aircraft on landing, permitting it to be landed at a lower air speed and with a significant improvement in the ability to its alignment with the runway even in a cross wind landing configuration.

I claim:

1. A stabilizer for aerospace vehicles comprising a narrow elongated low drag channel extending longitudinally of the vehicle, said channel being defined by a base and a pair of side walls extending away from the base, the longitudinal edges of the side walls remote from the base being bent inwardly toward each other, the channel being located on the rear half of the vehicle and opening outwardly of the vehicle, and the spacing of the side walls and the length of the channel having a predetermined cooperative relationship so as to create a directed control column of air between the side walls to stabilize the vehicle in flight.

2. A stabilizer according to claim 1 wherein the pair of side walls are a pair of thin fins secured along one longitudinal edge and oriented generally perpendicular to the fuselage of the vehicle, the transverse dimension of the fins having a taper increasing from the leading to the trailing end of the channel, thereby defining a shallow channel at the leading end gradually increasing in depth in the direction toward the trailing end of the fuselage.

3. A stabilizer according to claim 1 wherein the trailing end of the channel extends to the tail portion of the hull.

4. A stabilizer according to claim 1 wherein the length of the channel is at least equal to one-fourth of the overall length of the vehicle.

5. A stabilizer according to claim 1 wherein the depth of the channel is variable and increases in the direction opposite to the direction of flight of the vehicle.

6. A stabilizer according to claim 1 wherein the spacing of the side walls is approximately equal to the maximum depth of the channel.

7. A stabilizer according to claim 1 wherein the channel is affixed externally of the fuselage of the vehicle.

8. A stabilizer according to claim 1 wherein the channel is incorporated into the fuselage and is recessed internally of the surface thereof.

9. A stabilizer according to claim 1 wherein the channel is located on the fuselage of the vehicle such that a vertical projection of the longitudinal axis of the vehicle bisects the channel.

10. A stabilizer for aerospace vehicles comprising a pair of narrow elongated low drag channels, each of said channels being defined by a pair of thin side walls extending longitudinally of the vehicle, the longitudinal edges of the side walls located remotely with respect to the vehicle being bent inwardly toward each other, the channels being located on the rear half of the vehicle and opening outwardly of the vehicle, the spacing of the side walls of each of the channels and the length of each channel having a predetermined cooperative relationship so as to create a directed control column of air between the side walls of each channel to stabilize the vehicle in flight.

11. A stabilizer according to claim 10 wherein one of said pair of channels is located on top of the fuselage and the second of said pair is located at the bottom thereof.

12. A stabilizer according to claim 11 wherein the channels are located along the fuselage of the vehicle such that a vertical projection of the longitudinal axis of the vehicle bisects the top and bottom channel.

13. A stabilizer according to claim 10 wherein one of said pair of channels is located at one side of the fuselage of the vehicle and the second of said pair is located on the opposite side thereof.

14. A stabilizer according to claim 13 wherein the pair of channels are disposed along the fuselage of the vehicle such that a horizontal projection of the longitudinal axis of the vehicle bisects the channel located on each side of the fuselage of the vehicle.

15. A stabilizer for aerospace vehicles comprising four elongated narrow low drag channels, each channel being located in a different quadrant of the fuselage of the vehicle and each channel being defined by a pair of thin side walls extending longitudinally of the vehicle and being located on the rear half of the vehicle, the side walls of each channel having edges located remotely from the vehicle bent inwardly toward each other, the channels opening outwardly of the fuselage of the vehicle, the spacing of the side walls and the length of each of said channels having a predetermined cooperative relationship so as to create a control column of air between the side walls thereof to stabilize the vehicle in flight.

16. A stabilizer for a fluid dynamic projectile comprising a narrow elongated low drag channel defined by a pair of side walls extending longitudinally of the projectile, the channel having a base and two side walls extending away from the base and opening outwardly of the projectile, the longitudinal edges of the side walls located remotely from the base being bent inwardly toward each other, the channel being located on the rear half of the projectile and the spacing of the side walls and the length of the channel having a predetermined cooperative relationship so as to create a control column of air between the side walls to stabilize the projectile in flight.

17. A stabilizer according to claim 16 wherein the channel is affixed externally of the projectile.

18. A stabilizer according to claim 16 wherein the channel is incorporated into the projectile and is recessed into the surface thereof.

19. A stabilizer according to claim 16 wherein the overall length of the channel is equal to or greater than ¼ of the overall length of the projectile.

20. In an aerospace vehicle having an elongated hull, the improvement comprising a narrow, elongated low drag channel extending longitudinally of the hull, the channel having a base and two side walls extending outwardly with respect to the hull, the longitudinal edges of the side walls located remotely from the base being bent inwardly toward each other, the channel being located on the rear half of the vehicle and the spacing of the side walls and the length of the channel having a predetermined cooperative relationship so as to create a control column of air between the side walls and base to stabilize the vehicle in flight.

21. A channel according to claim 20 wherein the trailing end of the channel extends to the tail portion of the hull.

22. A channel according to claim 21 wherein the length of the channel is at least equal to ¼ of the overall length of the hull.

23. A channel according to claim 22 wherein the depth of the channel is variable and increases in the direction opposite to the direction of flight of the vehicle.

24. A channel according to claim 23 wherein the spacing of the side walls is approximately equal to the maximum depth of the channel.

25. A channel according to claim 24 wherein the side walls are canted inwardly toward the longitudinal axis of the channel.

26. A stabilizer for aerospace vehicles comprising a narrow elongated low drag channel extending longitudinally of the vehicle, said channel being defined by a base and a pair of side walls extending away from the base, the longitudinal edges of the side walls remote from the base being inwardly directed such that the edges of the side walls remote from the base are spaced closer together than the edges of the side walls adjacent to the base, the channel being located on the rear half of the vehicle and opening outwardly of the vehicle, the spacing of the side walls and the length of the channel having a predetermined cooperative relationship so as to create a directed control column of air between the side walls to stabilize the vehicle in flight.

27. A stabilizer for aerospace vehicles comprising a narrow elongated low drag channel defined by a pair of side walls extending longitudinally of the vehicle, the channel being incorporated into the rear half of the fuselage of the vehicle and being partially recessed internally of the surface thereof and opening outwardly of the vehicle, the spacing of the side walls and the length of the channel having a predetermined cooperative relationship so as to create a directed control column of air between the side walls to stabilize the vehicle in flight.

28. A stabilizer for a fluid dynamic projectile comprising a narrow elongated low drag channel defined by a pair of side walls extending longitudinally of the projectile, the channel having a base and two side walls extending away from the base and the channel being incorporated into the projectile and partially recessed into the surface thereof on the rear half of the projectile and opening outwardly of the projectile the spacing of the side walls and the length of the channel having a predetermined cooperative relationship so as to create a directed control column of air between the side walls to stabilize the projectile in flight.

29. A stabilizer for a fluid dynamic projectile comprising a narrow elongated low drag channel defined by a pair of side walls extending longitudinally of the projectile, the channel having a base and two side walls extending away from the base and opening outwardly of the projectile, the longitudinal edges of the side walls located remotely from the base being inwardly directed such that the remote edges of the side walls are spaced closer together than the side wall edges adjacent the base, the channel being located on the rear half of the projectile and the spacing of the side walls and the length of the channel having a predetermined cooperative relationship so as to create a directed control column of air between the side walls to stabilize the projectile in flight.

30. In an aerospace vehicle having an elongated hull, the improvement comprising a narrow elongated low drag channel extending longitudinally of the hull, the channel having a base and two side walls extending outwardly with respect to the hull, the side walls having edges located remotely from the base being inwardly directed toward each other such that the remote edges of the side walls are spaced closer together than the side wall edges adjacent to base, the channel being located on the rear half of the vehicle and the spacing of the side walls and the length of the channel having a predetermined cooperative relationship so as to create a control column of air between the side walls and base to stabilize the vehicle in flight.

* * * * *